US012693516B2

(12) United States Patent
Aharon

(10) Patent No.: US 12,693,516 B2
(45) Date of Patent: Jul. 28, 2026

(54) APERTURE EXTENDER FOR AUTOCOLLIMATORS AND TELESCOPES HAVING INDEX-MATCHING GEL OR FLUID BETWEEN PRISM FACETS

(71) Applicant: Oren Aharon, Haifa (IL)

(72) Inventor: Oren Aharon, Haifa (IL)

( * ) Notice: Subject to any disclaimer, the term of this patent is extended or adjusted under 35 U.S.C. 154(b) by 304 days.

(21) Appl. No.: 18/406,158

(22) Filed: Jan. 7, 2024

(65) Prior Publication Data

US 2025/0224605 A1 Jul. 10, 2025

(51) Int. Cl.
| | |
|---|---|
| *F41G 3/32* | (2006.01) |
| *F41G 7/26* | (2006.01) |
| *G01B 9/02055* | (2022.01) |
| *G02B 5/04* | (2006.01) |
| *G02B 17/00* | (2006.01) |
| *G02B 23/02* | (2006.01) |
| *G02B 23/10* | (2006.01) |
| *G02B 27/00* | (2006.01) |
| *G02B 27/30* | (2006.01) |

(52) U.S. Cl.
CPC ......... *G02B 23/02* (2013.01); *G01B 9/02068* (2013.01); *G02B 5/04* (2013.01); *G02B 17/008* (2013.01); *G02B 23/10* (2013.01); *G02B 27/0081* (2013.01); *F41G 3/323* (2013.01); *F41G 3/326* (2013.01); *F41G 7/26* (2013.01); *G01N 2201/1281* (2013.01); *G01N 2223/316* (2013.01); *G02B 23/105* (2013.01); *G02B 27/30* (2013.01)

(58) Field of Classification Search
CPC . F41G 3/323; F41G 3/326; F41G 7/26; G01B 9/02068; G01N 2201/1281; G01N 2223/316; G02B 5/04; G02B 7/1805; G02B 7/24; G02B 23/02–145; G02B 27/0081; G02B 27/30
See application file for complete search history.

(56) References Cited

U.S. PATENT DOCUMENTS

| | | | | |
|---|---|---|---|---|
| 3,659,926 A | * | 5/1972 | Charbonneau | ....... G02B 17/008 359/834 |
| 2001/0038447 A1 | * | 11/2001 | Detweiler | ............... G01S 3/789 356/141.4 |
| 2017/0351007 A1 | * | 12/2017 | Beder | ................... G02F 1/0102 |

* cited by examiner

*Primary Examiner* — Ryan S Dunning

(57) ABSTRACT

The disclosure introduces a technique to expand the aperture of an optical system like an Autocollimator by interconnecting two or more rhomboidal prisms in a sequential manner. This method involves securing the initial rhomboid to the autocollimator's aperture using a rotating component at its base. Subsequently, a second rotating component is attached to the exit end of the first rhomboid, enabling individual rotation for both rhomboids. These prisms are coated with distinct partial mirror coatings. The processing of the reflected image from these rhomboids are conducted to ascertain the deviation in the line of sight caused by their presence and positioning. A microprocessor computes the measurement of the back reflected beams concerning the rhomboids' positions, determining beam deviations resulting from imperfections in the manufacturing of the rhomboids. The identified imperfections are employed to rectify the outcomes derived from the assembly of rhomboids, ensuring heightened precision in the collected data.

6 Claims, 6 Drawing Sheets

APERTURE EXTENDER FOR AUTOCOLLIMATORS AND TELESCOPES HAVING INDEX-MATCHING GEL OR FLUID BETWEEN PRISM FACETS

BACKGROUND OF THE INVENTION

1. Field of Invention

The current invention pertains to an apparatus designed for capturing optical information external to a specified instrument aperture. This apparatus redirects the gathered information without compromising the parallelism or optical characteristics of the instrument's aperture.

2. Description of the Related Art

In optical applications, achieving precise inter-alignment and bore sighting among multiple devices positioned at offsets presents a significant challenge. Conventionally, employing an autocollimator capable of encompassing all device apertures is considered an ideal solution. However, this approach often proves prohibitively expensive and, in many cases, unfeasible due to substantial distances between the devices.

In instances where the separation between the optical devices to be aligned is smaller than the autocollimator's aperture, a viable method involves utilizing the autocollimator to project a reference cross. This projected reference cross facilitates alignment by analyzing the disparities between its observed images in the optical devices slated for alignment. Another approach involves reflecting the projected image from these devices and utilizing built-in software, commonly found in autocollimators, to assess and quantify the deviation between the two optical devices.

These methodologies offer efficient means of achieving alignment and bore sighting in scenarios where traditional autocollimation techniques encounter limitations imposed by large distances or cost constraints.

SUMMARY

The present invention addresses the challenge of testing the alignment of optical devices situated in close proximity, beyond the scope of conventional autocollimators or telescopic devices due to their limited optical aperture. This innovation proposes a solution by integrating multiple optical prismatic elements, particularly rhomboidal prisms, which, upon unfolding, expand the autocollimator's aperture to encompass all the devices under test. The objectives and advantages of this invention will be elucidated through the description of various embodiments.

In one embodiment, a pivotal aspect of this invention involves two rhomboidal elements. The first rhomboidal element houses a central axis of rotation aligned with the autocollimator's center, while the second rhomboidal element features an axis of rotation positioned at the output end of the first rhomboidal element. Precision manufacturing of these rhomboidal elements poses a challenge; however, their rotational movement with respect to each other significantly widens the covered aperture, surpassing the initial limits of the autocollimator's aperture.

Furthermore, the autocollimator, by monitoring back reflections from the surfaces of the rhomboidal prisms, can assess and correct any inaccuracies present within the prisms. This correction involves utilizing the measured inaccuracies to align the back-reflected information, aided by an autocollimator capable of projecting a reference cross at multiple wavelengths, simplifying the computation of rhomboidal inaccuracies. It should be evident to a professional that the same concept could be expanded to involve a serial connection of rhomboids, surpassing the two rhomboids already described.

Enhancing the device's functionality involves eliminating inter-reflections occurring between the optical surfaces of the rhomboidal elements. To achieve this, an innovative approach integrates an index matching gel or fluid between the rhomboids, nullifying the refractive index discrepancies between the elements and the surrounding air. The design of said index matching gel or fluid allows a relative movement between rhomboids while preserving index matching features.

By introducing these advancements, the invention aims to revolutionize alignment testing for closely situated optical devices, overcoming the limitations of traditional autocollimators and ensuring precise alignment through expanded aperture coverage and error correction mechanisms.

To summarize, the innovation discloses an aperture extender system for optical devices, comprising interconnected rhomboidal prisms configured to widen the aperture of an autocollimator or telescope beyond its original limits.

The rhomboidal prisms are secured to the autocollimator's aperture using rotating components allowing individual rotation for each rhomboid.

A method for assessing and correcting inaccuracies in rhomboidal prisms integrated into an aperture extender system, utilizing partial mirror coatings, microprocessor computation, and index matching gel or fluid to eliminate inter-reflections between rhomboidal surfaces. An application of the aperture extender system involving inter-rotation among rhomboids, demonstrating flexibility in covering a substantial input/output aperture beyond the original scope of the autocollimator.

Further comprising a penta-prism attachment enabling manipulation of the original optical axis of the autocollimator in combination with rotating rhomboids for enhanced flexibility and angle manipulation.

A method for aperture extender system for optical devices involving the following steps: interconnecting rhomboidal prisms, securing the initial rhomboid to the autocollimator's aperture using a rotating component at its base, attaching a second rotating component to the exit end of the first rhomboid, enabling individual rotation for both rhomboids, utilizing distinct partial mirror coatings on the rhomboids and process reflected images to assess the deviation in the line of sight caused by their positioning, and employing a microprocessor to compute the measurement of back-reflected beams concerning the rhomboids' positions, detecting imperfections in the rhomboids' manufacturing.

Moreover, the present invention provides an advanced aperture extender system for autocollimators and other optical devices. In one aspect, the system includes a first rhomboidal prism and a second rhomboidal prism interconnected in series, each mounted on independently rotatable couplings. A first rotating coupling secures the first rhomboidal prism to the aperture of an autocollimator and enables rotation about the autocollimator's optical axis. A second rotating coupling attaches the second rhomboidal prism to the exit facet of the first prism and enables rotation about the optical axis of the exiting beam.

A sealed cavity is formed between adjacent prism facets and is filled with an index-matching gel or fluid that eliminates inter-reflections during rotation. Each rhomboidal prism is further equipped with a partial-mirror coating configured to generate wavelength-selective back-reflected diagnostic images. A microprocessor processes these diagnostic images to compute correction data for line-of-sight deviations arising from manufacturing imperfections or alignment errors in the prisms. Through coordinated rotation and continuous calibration, the interconnected rhomboidal prisms substantially widen the effective aperture of the autocollimator beyond its original physical limits.

In certain embodiments, the rotating couplings are realized using magnetically biased annular bearing structures forming a sealed mechanical interface that retains the index-matching medium while permitting independent angular motion of each rhomboidal prism.

Another aspect of the invention provides a method for assessing and correcting inaccuracies in rhomboidal prisms used within the aperture extender. The method includes projecting a calibration beam through the prisms, receiving wavelength-selective partial reflections from coatings on the prism facets, detecting the reflections using the imaging system of the autocollimator, distinguishing reflections associated with each prism, computing angular deviations with a microprocessor, and applying correction factors to subsequent measurements. The index-matching gel within the sealed cavity minimizes stray reflections that could otherwise interfere with the diagnostic process.

A further aspect of the invention relates to applications in which the first and second rhomboidal prisms are interrotated to position the system's output aperture across a selectable region significantly larger than the original autocollimator aperture. This enables alignment, measurement, and optical capture over extended lateral fields that would otherwise be inaccessible.

In another embodiment, the aperture extender system includes a penta-prism attachment that redirects the autocollimator's original optical axis before it enters the first rhomboidal prism. The penta-prism's fixed-angle deviation, combined with multi-axis rotation of the rhomboidal prisms, provides enhanced flexibility in both angular manipulation and spatial coverage.

A method of operating the aperture extender system is also disclosed. The method includes interconnecting first and second rhomboidal prisms, securing and rotating the prisms using respective rotating couplings, filling the sealed cavity with index-matching gel, generating partial diagnostic reflections from the coated prism surfaces, processing the reflections to determine prism-induced deviations, and computing microprocessor-based corrections for accurate optical measurement during system operation.

Collectively, the disclosed systems and methods provide a mechanically robust, optically stable, and fully self-calibrating aperture extension mechanism. The invention enables precise optical measurement over extended fields that exceed the physical aperture limitations of traditional autocollimators.

DETAILED DESCRIPTION OF THE INVENTION

Rhomboid prisms are constructed in the shape of a parallelogram to displace a light beam or the line of sight without affecting the orientation of the image. The prisms have two smaller parallel reflecting surfaces (legs) that are cut at a 45-degree angle to a much longer rectangular-shaped body. A variety of additional prism designs have unique properties, primarily image erecting and inversion, which enable them to perform specific functions which may be attached to my rhomboids to create capability of not only expanding the original aperture but also to change its initial orientation.

For better understanding of the disclosed art a short description of classical autocollimators is needed (although the technology is applicable to laser beam or other light sources). For creating the effect of autocollimation a light source projects a cross which is imprinted on a reticle. The projected image passes through the beam splitter and further projected by an objective lens exiting the autocollimator's body through an aperture. Usually, the objective collimated the exiting projected cross.

Collimation means that the projected reticle is exactly one focal length away from the main surface of the objective lens. The projected collimated light is back reflected by a mirror, or other high-quality reflective surface, and is captured by the aperture of said objective lens. The returned image appears in sharp focus on the high-quality CCD detector. Due to the detector high sensitivity even very faint back reflection will be captured and displayed.

Deviation of the mirror by an amount A is causing deviation on the original line of sight by an amount of 2A. Assuming the amount of deviation of the reflective surface the focal length is denoted by FL, then mirrors' deviation is to be determined from the relationship: $A=X/2FL$ From the equation it is apparent that measuring mirror angular deviation is independent of the distance between the instrument and the reflecting surface. Deviations in azimuth and elevation can then be electronically determined and calculated by a computer. Furthermore, the results are than clearly displayed on its screen. Resolution down to 0.01 arcsec is achievable.

As a rule of thumb, the higher the FL—the higher the resolution. As a result, the field of view is smaller and thus it is more difficult to acquire the reflected signal acquisition.

The electronic method offers the advantage of complete objectivity in data recording, as well as a computer interface unlike optical autocollimators which are bulkier and less accurate.

In a telescopic application, where the telescope is calibrated to infinity, the angle of movement is $A=X/FL$.

Figure 1:
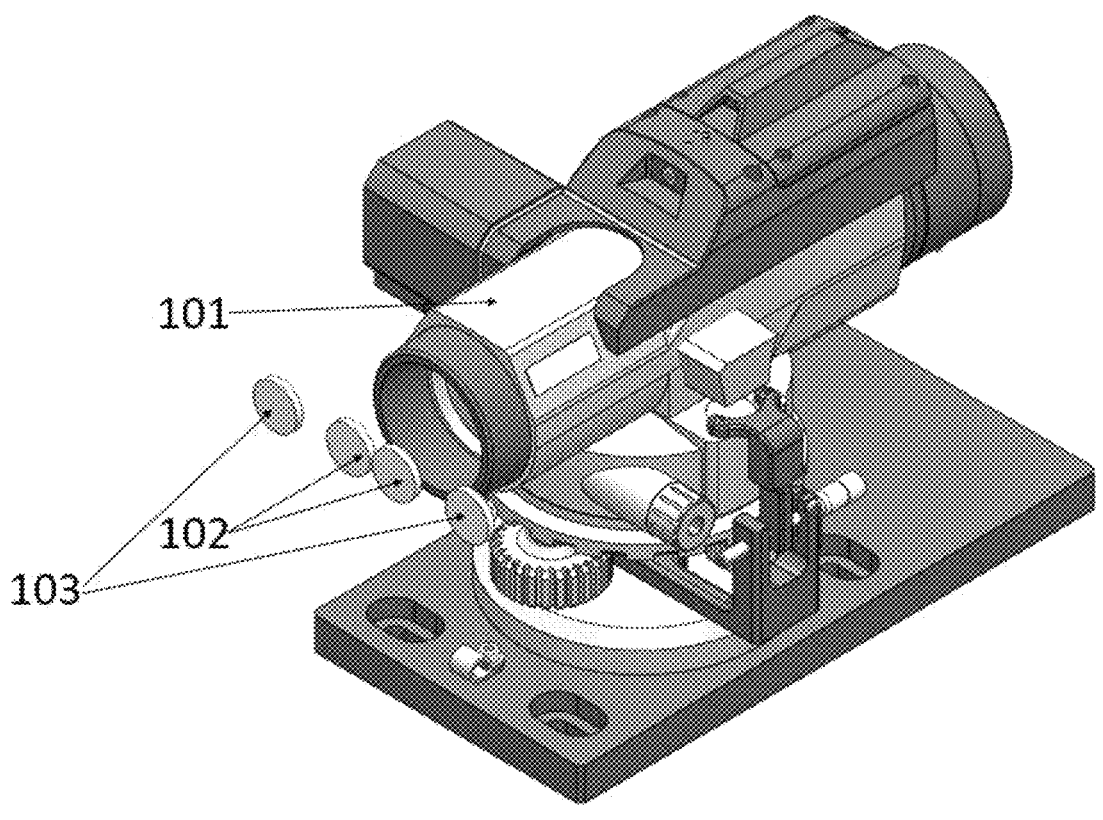
FIG. 1 is a perspective view of the problematic setup of prior art when alignment of elements outside of the autocollimator's aperture are needed.

FIG. 1 visually demonstrates the constraints associated with a finite aperture system. The Autocollimator 101 possesses a specific aperture size through which it projects a cross. When two mirrors, identified as 102, fall within the confines of this aperture, the autocollimator captures the back reflections from these mirrors, enabling the acquisition and display of their respective angles. Conversely, if two mirrors, designated as 103, exist outside the autocollimator's aperture and are positioned in front of the device, no reflections are generated. As a result, in current technological setups, the angle positions of these mirrors remain undetermined and cannot be ascertained.

Figure 2:
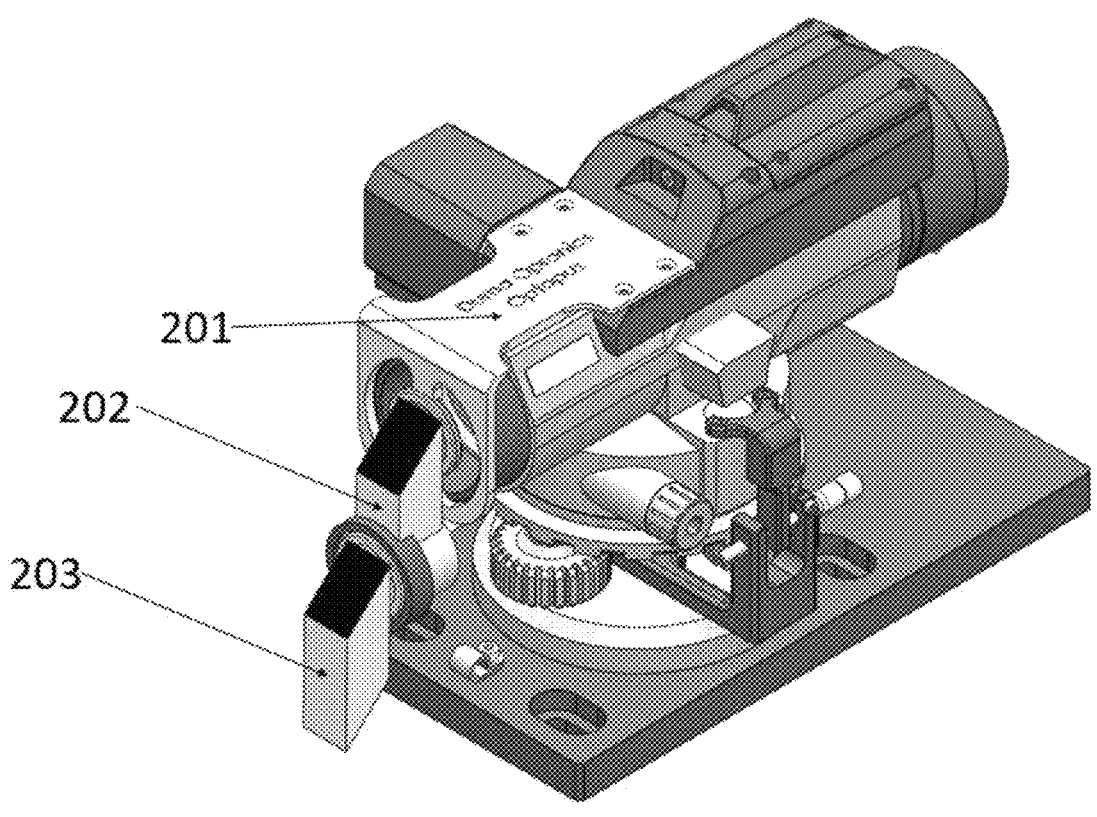
FIG. 2 is a perspective view of an Autocollimator equipped with two rhomboidal prisms rotating one in the center of the Autocollimator's aperture, and the second rotating around the center of the output of first rhomboid.

In FIG. 2, the depicted autocollimator, akin to that in FIG. 1, includes a mechanical attachment marked as 201. This attachment accommodates mounted rhomboidal elements arranged in a manner where the first rhomboid, denoted as 202, executes a rotational movement of its input face around the center of the autocollimator's aperture. Additionally, rhomboid 203, affixed to the exit surface of rhomboid 202, possesses the capability to rotate around the center of the output surface of rhomboid 202. These two rotational degrees of freedom enable the positioning of the output surface of rhomboid 203 at various locations within a circumference determined by the combined length of both rhomboidal elements. Consequently, this configuration expands the aperture, allowing the reception and transmission of input/output information from an area significantly larger than the original autocollimator's aperture.

Figure 3:
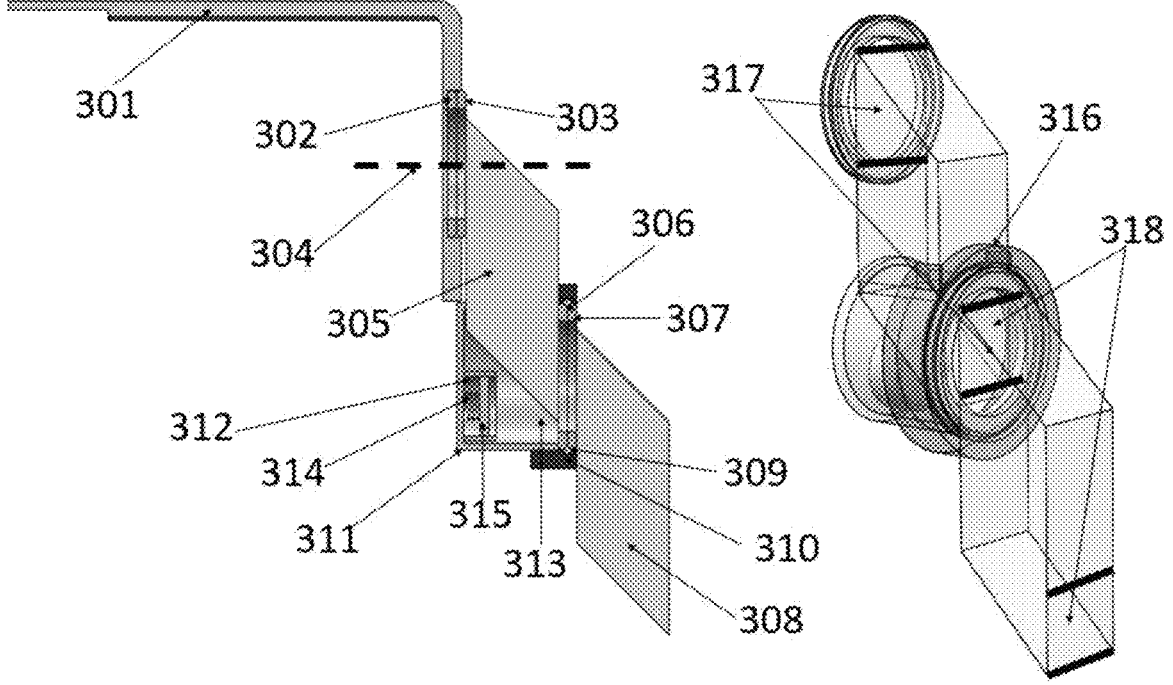
FIG. 3 is a depiction image of the mechanical layout of two rotating rhomboids.

In FIG. 3, the arrangement showcases two interconnected rhomboids capable of independent rotation in relation to each other. The rotation occurs at the exit of one rhomboid and the input of the second. Notably, the first rhomboid's input is positioned at the optical axis of an optical autocollimator and is free to rotate concentrically around this axis. The elements in this arrangement include:

301: A mechanical attachment linking the autocollimator to the rhomboidal layout, 302 and 303: Bearing devices composed of two annular magnets connected by magnetic force, allowing rotational movement, 304: Represents the optical axis of the autocollimator and the center of rotation for the magnetic bearing, 305: The first rhomboidal attachment with an input area facing the autocollimator's aperture, capable of rotating around the optical axis 304. 306 and 307: Similar magnetic bearings enabling rotation between the output of the first rhomboid and the input of the second rhomboid 308. 309: A ring sealing mechanism between the magnetic bearing facets, preventing leaks of fluids or gels from the cavity formed by the distance between the rhomboids' facets, 310: Housing for the magnetic bearing connection of the two rhomboids, 311: A small reservoir containing index-matching liquid 313 or gel, filling the gap between the output facet of the first rhomboid and the input facet of the second rhomboid. This filler is pressurized by cylinder 312 to counteract potential leaks, ensuring prolonged device lifespan. The pressure effect is achieved by a spring device 314 applying force on a piston-like 315.

For measuring angular deviations due to rhomboid inaccuracies, special coatings can be applied to the input and output facets of each rhomboid. These coatings cause partial reflection of the cross projected by the autocollimator through the rhomboid, allowing the autocollimator to measure these inaccuracies. To distinguish between the first and second rhomboids, different coatings such as dichroic coatings can be utilized, causing each rhomboid to reflect different wavelengths based on its coating. The autocollimator identifies back reflections by their colors, employing a color camera or projecting crosses of different colors. 317 and 318 represent coatings on the first and second rhomboids, respectively. 316 signifies the adhesive area between the rhomboid and the bearing housing 310.

Figure 4:
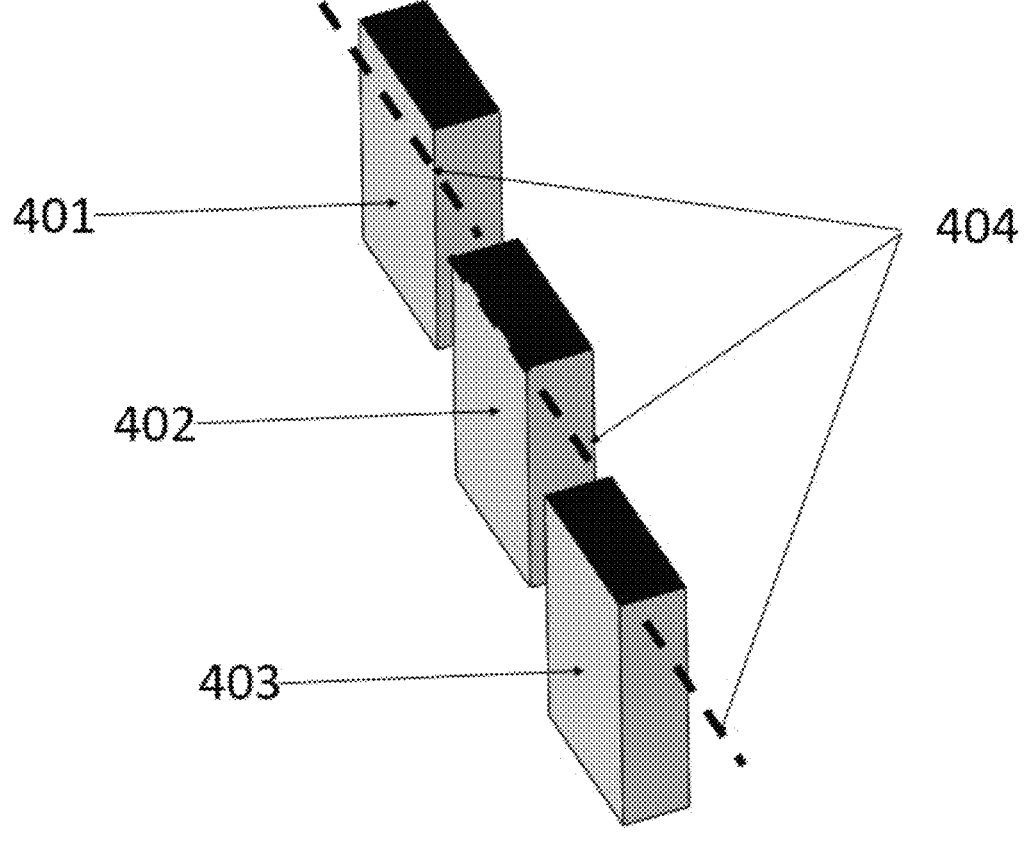
FIG. 4 is a serial setup showing more than two rhomboids connected together.

FIG. 4 illustrates a potential serial linkage of rhomboids, surpassing a two-rhomboid connection as disclosed, to establish an extended and highly flexible rhomboidal attachment. Rhomboids labeled as 401, 402, and 403 are depicted within this configuration. Each rhomboid is identified by its respective rotation axis, designated as 404.

Figure 5:
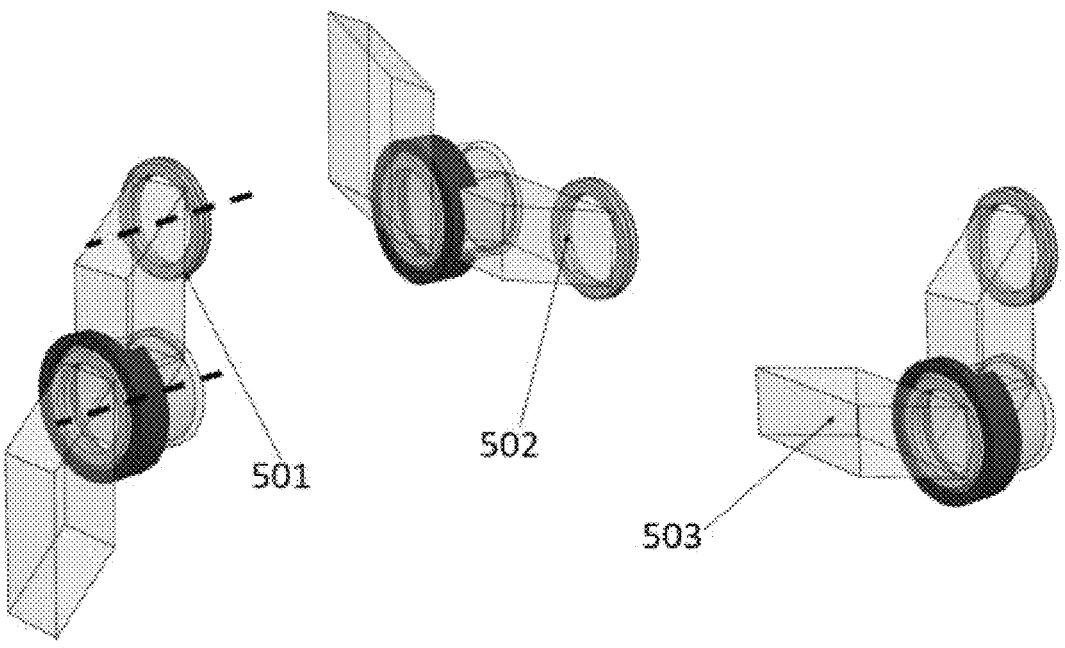
FIG. 5 is an image showing the rhomboid prismatic elements rotated in respect to each other and creating a larger encompassed area when compared to the original Autocollimator's aperture.

FIG. 5 presents a demonstrative representation of the inter-rotation among rhomboids in relation to one another. Specifically, depiction 501 showcases a scenario of zero rotation, while illustration 502 portrays rotation around both rotational axes. Additionally, FIG. 503 illustrates rotation around a singular axis, effectively highlighting the system's flexibility in covering a substantial input/output aperture.

Figure 6:
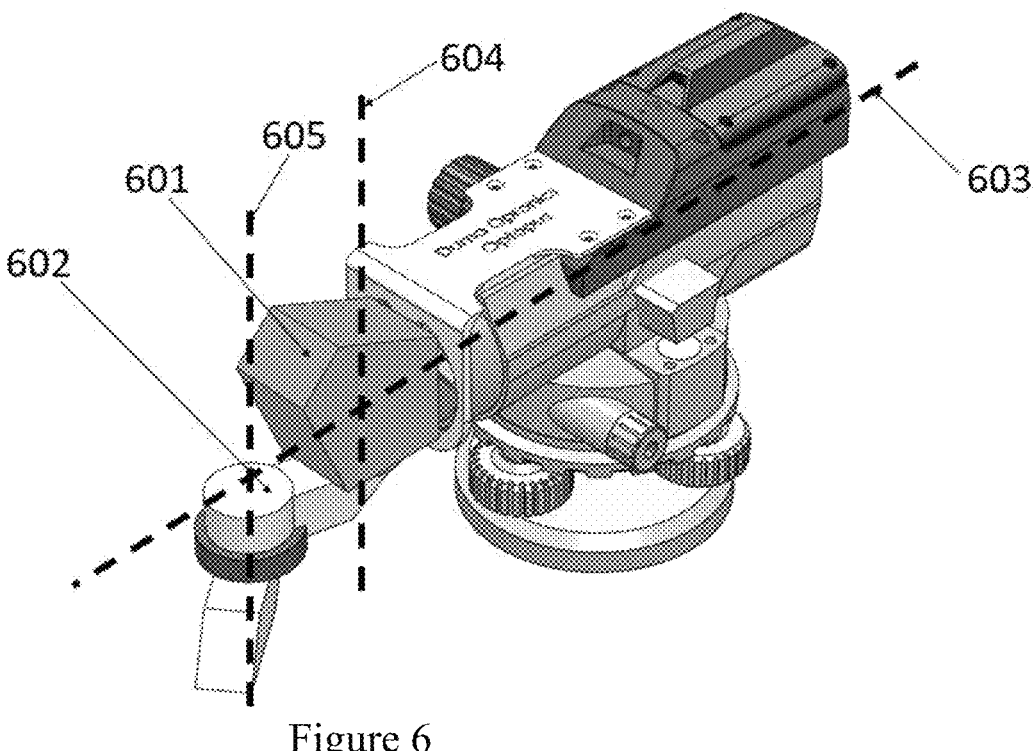
FIG. 6 is yet another embodiment showing the rhomboidal prismatic element attached to another prismatic element in such a way that the prismatic element reflects the output from the Autocollimator at a different angle which is further manipulated by said rotating rhomboids.

FIG. 6 displays an alternative application wherein the original optical axis of the autocollimator undergoes a 90-degree deflection through the utilization of a designated penta-prism, identified as 601. Two rhomboidal systems, akin to the disclosed arrangement within this invention, are linked to the mentioned penta-prism, labeled as 602. These systems possess the capability to rotate around axes 604 and 605. The initial autocollimator's line of sight is indicated by reference numeral 603.

The invention claimed is:

1. An aperture extender system for optical devices, comprising a first rhomboidal prism and a second rhomboidal prism interconnected in series; a first rotating coupling securing the first rhomboidal prism to an autocollimator's aperture such that the first rhomboidal prism rotates concentrically about the autocollimator's optical axis;

a second rotating coupling securing the second rhomboidal prism to an exit facet of the first rhomboidal prism such that the second rhomboidal prism rotates about the optical axis of an exiting beam; wherein a sealed cavity is formed between adjacent facets of the rhomboidal prisms and contains an index-matching gel or fluid that eliminates inter-reflections during rotation;

wherein each rhomboidal prism includes a partial-mirror coating configured to generate wavelength-selective back-reflected diagnostic images; and wherein a microprocessor receives the back-reflected diagnostic images and computes correction data for line-of-sight deviations introduced by prism manufacturing or alignment imperfections, such that the interconnected rotating rhomboidal prisms widen the effective aperture of the autocollimator beyond its original physical limits.

2. The system of claim 1, wherein the first rotating coupling and the second rotating coupling comprise magnetically-biased annular bearings forming a sealed mechanical interface that maintains the index-matching gel or fluid within the cavity while allowing independent rotation of each rhomboidal prism.

3. An application of the aperture extender system of claim 1, wherein the first rhomboidal prism and the second rhomboidal prism are inter-rotated to position an output aperture of the system over a selectable region substantially larger than the original aperture of the autocollimator.

4. The system of claim 1, further comprising a penta-prism attachment positioned at the autocollimator's output and configured to redirect the autocollimator's original optical axis prior to entering the first rhomboidal prism, wherein the redirection provided by the penta-prism is combined with rotation of the first and second rhomboidal prisms to expand both angular reach and spatial coverage of the aperture extender system.

5. A method for assessing and correcting inaccuracies in rhomboidal prisms integrated into an aperture extender system, the method comprising: projecting a calibration beam from an autocollimator through a first rhomboidal prism and a second rhomboidal prism;

receiving partial back-reflections generated by partial-mirror coatings on facets of each rhomboidal prism; detecting the back-reflections with an imaging sensor of the autocollimator; identifying, via wavelength separation or coating characteristics, which back-reflections correspond to which rhomboidal prism;

computing, by a microprocessor, angular and positional deviations attributable to manufacturing or alignment imperfections in each rhomboidal prism; and applying correction data to measurements acquired through the aperture extender system to compensate for the computed deviations, wherein an index-matching gel or fluid disposed between adjacent prism facets reduces inter-reflections that would otherwise corrupt the diagnostic reflections.

6. A method of operating an aperture extender system for optical devices, the method comprising:

interconnecting a first rhomboidal prism and a second rhomboidal prism in series;

securing the first rhomboidal prism to an autocollimator's aperture using a first rotating coupling that allows rotation about the autocollimator's optical axis;

employing a microprocessor to compute the measurement of back-reflected beams concerning the rhomboids' positions, detecting imperfections in the rhomboids' manufacturing;

utilizing distinct partial mirror coatings on the rhomboids and processing reflected images to assess the deviation in the line of sight caused by their positioning; and attaching a second rotating rotating coupling to an exit facet of the first rhomboidal prism to support rotation of the second rhomboidal prism about an axis of an exiting beam;

filling a sealed cavity between adjacent prism facets with an index-matching gel or fluid to eliminate inter-reflections during rotation;

generating partial back-reflections from partial-mirror coatings on facets of the rhomboidal prisms;

processing the reflected images to determine line-of-sight deviations introduced by prism positioning or imperfections; and computing by a microprocessor, correction values based on the back-reflections to compensate for prism-induced deviations during measurement.

* * * * *